United States Patent

[11] 3,537,588

[72] Inventor George T. Backer
 Horseheads, New York
[21] Appl. No. 713,005
[22] Filed March 14, 1968
[45] Patented Nov. 3, 1970
[73] Assignee Corning Glass Works
 Corning, New York
 a corporation of New York

[54] MEMBRANE SUPPORT PLATES
 18 Claims, 6 Drawing Figs.
[52] U.S. Cl. .................................................. 210/321,
 210/541
[51] Int. Cl. .................................................. B01d 31/00
[50] Field of Search .......................................... 210/321,
 498, 500, 510, 541, 542

[56] References Cited
UNITED STATES PATENTS
3,303,254 2/1967 Simons .................... 210/498X
3,438,504 4/1969 Furman .................... 210/500X Primary Examiner—Reuben Friedman
Assistant Examiner—Frank A. Spear, Jr.
Attorney—Clarence R. Patty, Jr. and Charles W. Gregg ABSTRACT: Membrane support plates or panels for fluid exchange or dialyzer chambers, each such plate comprising a vitreous photosensitively opacifiable material having at least one flat surface including a first region which is selectively opacified and etched to provide a myriad of crisscross and evenly spaced-apart rows of projections or pillars having relatively flat and minute end surfaces for support of a membrane thereon and substantial spaces between said projections for fluid flow.

Patented Nov. 3, 1970
3,537,588
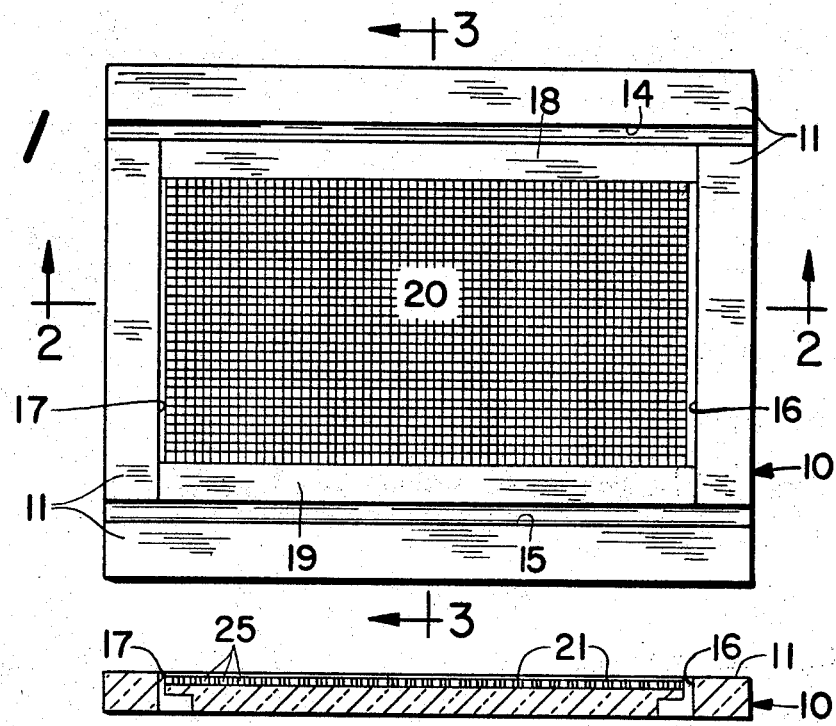
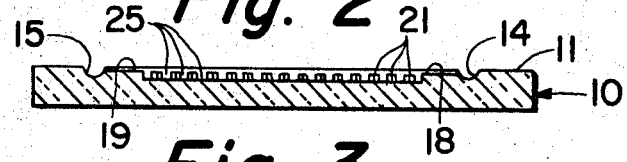
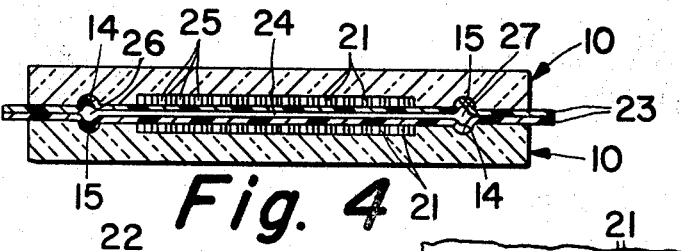
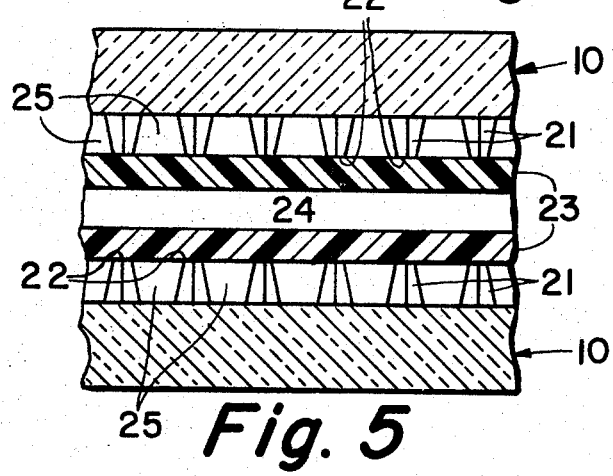
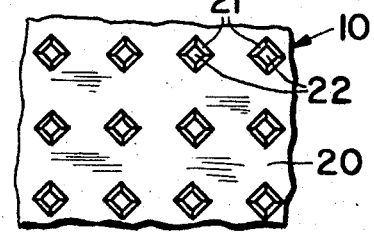
INVENTOR.
George T. Backer
BY
Charles W. Gregg
AGENT 3,537,588

MEMBRANE SUPPORT PLATES

BACKGROUND OF THE INVENTION

The invention relates to membrane support plates or panels for use in fluid exchange chambers such as, for example, dialyzer chambers for artificial kidneys.

In U.S. Pat. No. 3,074,559, issued Jan. 22, 1963 to Francisco Martino Savino, for example, there is disclosed a dialyzer chamber and membrane support plate to be utilized in a dialysis type of artificial kidney. While the membrane support plates such as disclosed in said patent provided a substantial advancement in the art of manufacturing dialyzer chambers such as may be used in artificial kidneys, development of even more improved membrane support plates is continuously being attempted. Accordingly, the membrane support plates of the present invention and the method of making such plates were developed.

SUMMARY OF THE INVENTION

In practicing the present invention there is provided a basic plate or panel of a vitreous photosensitively opacifiable material having a flat surface which is selectively opacified and then etched to form a myriad of crisscross and evenly and substantially spaced-apart rows of identical projections or pillars having relatively flat and minute end surfaces for support of a fluid exchange or dialysis membrane thereon. Channels and openings are provided in said plate so that when a fluid exchange membrane is provided on each of a pair of said plates and said plates are securely disposed with said membranes facing each other, a first fluid may be introduced between said membranes and a second fluid introduced into the spaces between the rows of projections or pillars on each of said pair of plates to provide an improved fluid exchange chamber.

BRIEF DESCRIPTION OF THE DRAWINGS

In the drawings:

FIG. 1 comprises a top view of a membrane support plate embodying the invention;

FIG. 2 is a cross-sectional view of the plate of FIG. 1 taken generally along line 2-2 of FIG. 1;

FIG. 3 is a cross-sectional view similar to FIG. 2 and taken generally along line 3-3 of FIG. 1;

FIG. 4 is a cross-sectional view of a pair of plates similar to that of FIG. 1 and including a membrane on each said plate which are disposed in a facing relationship with each other to make a fluid exchange or dialyzer chamber;

FIG. 5 is a substantially enlarged view of a center section of the pair of membrane support plates of FIG. 4 illustrating the manner in which the membranes are supported when used in a fluid exchange chamber; and FIG. 6 comprises a substantially enlarged top view of a center section of the support plate of FIG. 1 illustrating an arrangement of rows of projections used for the support of a membrane on the plate.

Similar reference characters refer to similar parts in each of the FIGS. of the drawings.

DESCRIPTION OF THE PREFERRED EMBODIMENT

Referring to the drawings in detail, there is shown in FIG. 1 a plate or panel of vitreous photosensitively opacifiable material. Plate 10 may, for example, be formed of a photosensitively opacifiable glass such as disclosed in U.S. Pat. No. 2,684,911, issued July 27, 1954 to Stanley Donald Stookey, or of a glass-ceramic material such as disclosed in U.S. Pat. No. 2,971,853, issued Feb. 14, 1961 also to Stanley Donald Stookey.

The top surface 11 of plate 10 is generally flat and includes a pair of spaced-apart parallel grooves or channels 14 and 15 (FIGS. 1, 3 and 4) which extend the length of the plate and which can be provided therein during the forming of the plate. Plate 10 further includes a pair of spaced-apart, parallel and longitudinal openings 16 and 17 (FIGS. 1 and 2) which extend entirely through the plate and which can also be provided therein during the forming of the plate. Plate 10 further includes longitudinal areas 18 and 19 (FIGS. 1 and 3) which border on and parallel grooves 14 and 15, respectively. The surfaces of areas 18 and 19 are preferably slightly depressed below surface 11 of plate 10 and, if so depressed, may be provided in the plate during forming thereof. However, as hereinafter further pointed out, areas 18 and 19 need not necessarily be provided with depressed surfaces.

The central region 20 of plate 10 between openings 16 and 17 in such plate, and between areas 18 and 19 of the plate (FIG. 1) is provided with a myriad of crisscross and aligned rows of substantially spaced-apart and minute projections or pillars 21. For ease of illustration, region 20 and its crisscross rows of projections are shown in FIG. 1 as a multiplicity of crisscross lines. However, said projections per se are illustrated in more detail in the other FIGS. of the drawings and will be readily understood from the following description thereof taken in conjunction with FIGS. 5 and 6 of the drawings in particular. If the surfaces of areas 18 and 19 of plate 10 are depressed below surface 11 of such plate as previously mentioned, the surface region 20 of the plate is correspondingly depressed and, therefore, so are the surfaces of the ends of the projections 21 provided in such region 20. If, however, said areas 18 and 19 are not provided with depressed surfaces, neither is the surface of region 20 and, therefore, the surfaces of the ends of projections 21 extend in the same plane as the surfaces of areas 18 and 19 of plate 10. This will be discussed further hereinafter in the description.

As illustrated in FIGS. 5 and 6, region 20 of a plate such as 10 is, as mentioned above, provided with projections 21 which are substantially spaced-apart from each other and are arranged in crisscross aligned rows (FIG. 6 taken in conjunction with FIG. 1). Projections 21 are preferably square in cross section, as shown, and have relatively minute and flat end surfaces 22 (FIGS. 5 and 6) which are intended for support of a membrane such as 23 (FIGS. 4 and 5). The spacing between the centers of the ends 22 of projections 21 is, for example, preferably on the order of about .030 inch across the width and length of region 20 of plate 10. The surfaces of the ends 22 of projections 21 are preferably on the order of about $9 \times 10^{-6}$ inch squared. Projections 21, if square in cross section, are also preferably aligned across the length and width of region 20 of plate 10 as shown in FIG. 6. However, it is pointed out that the projections need not necessarily be square in cross section as shown but may be of other cross-sectional configurations such as round, triangular, etc. The most important consideration for projections such as 21 is the dense distribution thereof per square inch of region 20 taken in conjunction with the areas of the minute end surfaces of such projections. With the dimensions given previously there are approximately 2,200 projections such as 21 in each square inch of region 20 and the areas of end surfaces 22 of the projections total only about 2 percent of the total area of region 20.

The projections or pillars 21 are provided in region 20 of a plate such as 10 by selectively exposing said region to shortwave radiations, and thereafter opacifying and etching such region. The first step may be accomplished by disposing against surface 11 of a plate such as 10 a photographic negative having a pattern of transparent and opaque areas defining the projections 21 which are to be provided in region 20 of plate 10. The opaque areas of the photographic negative cover all of surface 11 of plate 10, including areas 18 and 19, and the relatively minute areas of the ends of the projections 21 to be provided in region 20 of the plate. Thus, the transparent areas of the negative cover the spaces which are to be provided between the rows of projections 21. The areas covered by the transparent areas of the photographic negative are then exposed to a source of shortwave radiations such as ultraviolet radiations emanating from a suitable arc lamp, for example, and issuing through a columnator and suitable filter to impinge upon the areas not covered by the opaque areas of the photographic negative. The period of exposure of the areas covered by the transparent areas of the negative depends, of course, on the composition of plate 10 and such irradiation of said areas renders them capable of heat-developed opacification.

Following the irradiation of plate 10 as discussed above, the plate, and especially surface 11 and the areas thereof adjoining such surface and including region 20, are heated as by a suitable electric or other type of heater to produce opacification of the irradiated areas. Surface 11 and its adjoining areas are then immersed in a hydrofluoric acid solution until the more soluble portions of region 20, that is, the opacified portions of such region are dissolved or removed. Alternatively, surface 11 and its adjoining areas, with the exception of region 20, may be masked with an acid-resistant material such as wax and such masked areas and region 20 may then be immersed in the hydrofluoric acid solution. As another alternative, the entire plate 10, except for region 20 thereof, may be covered with said acid-resistant material and the entire plate 10 then immersed in an acid bath of hydrofluoric acid solution until the opacified areas of region 20 are dissolved. Following the removal of the opacified areas of region 20, the plate is rinsed as by distilled water and the masking material, if used thereon, is then removed. The membrane support plate is then complete.

The techniques described above for processing an article of photosensitively opacifiable material such as plate 10 are now well known but, if a more complete understanding of such techniques is desired, reference may be made to the previously cited patents to Stookey along with U.S. Pat. No. 2,628,160, issued Feb. 10, 1953 to Stanley Donald Stookey.

Referring further to FIGS. 4 and 5 of the drawings, a pair of membrane support plates, such as the etched plate 10 just described, are provided and a membrane, such as membranes 23 shown in said drawing FIGS., is spread over surface 11 and the adjoining areas including region 20 of each plate with each membrane being inserted in channels 14 and 15 in its respectively associated plate. Each such membrane, by the way of example only, may be a sheet of cellophane on the order of about one mil in thickness. The pair of support plates are then disposed with said membranes facing each other as shown in FIG. 4 of the drawings. The pair of plates are tightly clamped, by any suitable means, so as to provide intimate contact between surface 11 of each plate and the portion of the surface of the respectively associated membrane contacting such surface, and so as to provide intimate contact, with one another, of the corresponding opposite portions of the surfaces of said membranes. Thus, fluid-tight seals are provided between said surfaces or portions thereof which are in intimate contact in the areas described. Such arrangement provides an open area 24 (FIGS. 4 and 5) between the pair of membranes such as 23 where such membranes are spread over regions 20 of the pair of plates. The open area 24 extends between the membranes where they cross over the depressed surfaces of areas 18 and 19 of the plates (FIG. 4) and thence extends into channels 26 and 27 between the membranes where they are disposed adjacent the bottom surfaces of channels 14 and 15 in the plates. Suitable fluid parts (not shown) are tightly inserted in the ends of said channels 26 and 27 and help to maintain the membranes against said bottom surfaces of channels 14 and 15 in the plates. If, as previously mentioned, the surfaces of areas 18 and 19 of the pair of plates are not depressed, four relatively thin, fluid-proof gaskets are provided between the membranes 23 before clamping the pair of plates and such membranes together. Two of these gaskets are provided between those portions of membranes 23 which contact the parts of surface 11 of plate 10 bordering the outer edges of channels 14 and 15, and the other two of such gaskets are provided between those portions of membranes 23 which contact the parts of said surface 11 bordering the outer edges of openings 16 and 17. Each of these latter two gaskets extend to the inner edges of channels 14 and 15. Thus, when the pair of plates are clamped together as previously described, a space such as 24 is provided with channels 26 and 27 remaining unobstructed by the gaskets. It is apparent that such arrangement as just described is similar to that described in conjunction with FIG. 4, that is, is similar to that provided when areas 18 and 19 are provided with depressed surfaces.

The etched out portions of region 20 of each plate such as 10, and extending between the rows of projections such as 21 on each plate, provide crisscross channels 25 (FIGS. 2 through 5) which connect with openings 16 and 17 extending through each respective plate (FIG. 2). It is thus apparent that a first fluid introduced into channel 26 or 27 (FIG. 4) provided between the membranes such as 23 can flow through the open area 24 provided between such membranes and out of the channel 26 or 27 opposite to that into which such first fluid was introduced. A second fluid introduced into opening 16 or 17 in each of the pair of plates such as 10 can flow through the previously-mentioned channels 25 in each respective plate and out of such channels 25 in each respective plate through the respective opening 16 or 17 opposite to that into which said second fluid was introduced. Such first and second fluids can, therefore, flow through the pair of plates and be maintained separated from each other by only the membranes such as 23.

A dialysis or fluid exchange chamber can be made using the membrane support plates or panels of the present invention as described above. Such chambers are especially useful in hemodialysis such as artificial kidney systems or in oxygenation-dialysis processes which are now well known. However, if additional information relating to such systems and methods is desired, reference may be made to the previously-cited patent to Savino as well as to U.S. Pat. Nos. 3,034,505, issued May 15, 1962 to B. J. Sobol; 3,212,498, issued Oct. 19, 1965 to R. W. McKirdy et al.; 3,212,642, issued Oct. 19, 1965 to J. A. Kylstra; and 3,352,779, issued Nov. 14, 1967 to A. J. Austin et al., among others.

The membrane support plates or panels of the present invention have several distinct advantages over such plates previously employed in making fluid exchange chambers, and especially fluid exchange chambers which are to be used in the systems and processes mentioned above. Such advantages are set forth below.

The vitreous materials of which the membrane support plate or panel of the present invention may be made are noncorrosive and are more chemically inert than metal or metallic oxide materials heretofore often employed in making membrane support plates. Furthermore, said vitreous materials, if properly selected, have a lower coefficient of expansion than materials heretofore employed. This latter feature makes for dimensional stability of the membrane support plates of the present invention.

The support plates of the present invention are very readily cleaned and can be sterilized at much higher temperatures than support plates made of plastics.

The membrane support pillars or projections of the support plates of the present invention will contact a smaller area of a membrane employed therewith than will the support pillars or projections of prior support plates and, therefore, a greater percentage of the surface of the membrane is exposed to the dialysis fluid employed in a dialysis chamber using the support plates of the present invention. This feature permits the use of support plates of smaller dimensions than heretofore employed, or provides greater efficiency of support plates equal in size to those previously employed.

The use of a photosensitively opacifiable vitreous material and the method described herein to make the support plate of the present invention is an extremely economical manner of making support plates having more precisely reproducible tolerances than support plates made of materials heretofore employed.

Insofar as is known, there is no prior method of making membrane support plates having membrane support pillars or projections of the minute size attainable by using the vitreous materials and method discussed herein. Regardless of the minute size of said projections, the precisely reproducible tolerances mentioned above are also readily attainable by the use of the materials and method described.

The large number of minute projections or pillars per unit area obtainable by using the materials and methods described herein for making membrane support plates, and the relatively large spacing provided between the projections, while still retaining the ability to support the membranes on the ends of said projections, permits substantially laminar flow of a fluid between and around said projections and, therefore, a greater flow of such fluid per unit of time without an intolerable resistance to the flow of the fluid.

Although there is herein shown and described but one specific form of a membrane support panel or plate for use in fluid exchange chambers, it will be understood that various changes and modifications may be made therein within the purview of the appended claims without departing from the spirit and scope of the invention.

I claim:

1. As an article of manufacture, a membrane support plate having at least one flat surface and comprising a vitreous photosensitively opacifiable material which when so opacified is subject to etching, said plate having first and second spaced-apart channels formed in said one surface and bordering first and second opposite sides, respectively, of a selected area thereof, said area being selectively opacified and etched to provide first and second etched regions, said first region embodying a myriad of crisscross and evenly spaced-apart rows of substantially identical projections having relatively flat and minute end surfaces, and said second region surrounding said first region and having a surface extending in the same plane as said end surfaces, said plate also embodying first and second openings extending therethrough at first and second opposite ends, respectively, of said first region and connecting with the spaces between the rows of projections adjacent each respective said end of said first region.

2. A plate as defined in claim 1 and in which said material is a glass.

3. A plate as defined in claim 1 and in which said material is a glass-ceramic.

4. A plate as in claim 1 and in which the areas of said end surfaces of said projections total approximately only about 2 percent of the area of said first region.

5. A plate as defined in claim 4 and in which said material is a glass.

6. A plate as defined in claim 4 and in which said material is a glass-ceramic.

7. A plate as in claim 1 and in which said projections are square in cross section.

8. A plate as defined in claim 7 and in which said material is a glass.

9. A plate as defined in claim 7 and in which said material is a glass-ceramic.

10. A plate as in claim 7 and in which the areas of said end surfaces of said projections total approximately only about 2 percent of the area of said first region.

11. A plate as defined in claim 10 and in which said material is a glass.

12. A plate as defined in claim 10 and in which said material is a glass-ceramic.

13. A pair of plates such as defined in claim 1 and further including a membrane spread over said one surface of each respective plate and extending into said channels of the respective plate, whereby said plates may be complementarily disposed relative to one another and clamped together with said membranes facing each other to provide a fluid exchange chamber.

14. A pair of plates as defined in claim 13 and in which said material is a glass.

15. A pair of plates as defined in claim 13 and in which said material is a glass-ceramic.

16. A pair of plates such as defined in claim 13 and in which said membranes are dialysis membranes and said fluid exchange chamber is a dialyzer chamber.

17. A pair of plates such as defined in claim 16 and in which said material is a glass.

18. A pair of plates such as defined in claim 16 and in which said material is a glass-ceramic.